US005532973A

United States Patent [19]
Zehner

[11] Patent Number: 5,532,973
[45] Date of Patent: Jul. 2, 1996

[54] RESOLVING POWER TARGET FOR SIDE-SCANNING SONARS

[75] Inventor: William J. Zehner, Lynn Haven, Fla.

[73] Assignee: The United States of America as represented by the Secretary of the Navy, Washington, D.C.

[21] Appl. No.: 521,376

[22] Filed: Jun. 9, 1995

[51] Int. Cl.⁶ ................................................ H04B 17/00
[52] U.S. Cl. ................................................ 367/13; 367/88
[58] Field of Search ........................................ 367/13, 88

[56] References Cited

U.S. PATENT DOCUMENTS 5,463,593  10/1995  Zanelli et al. .......................... 367/13

Primary Examiner—Daniel T. Pihulic
Attorney, Agent, or Firm—Harvey A. Gilbert; William C. Townsend

[57] ABSTRACT

A resolving power target for side-scanning sonars and other sound transmitting devices such as but not limited to ultrasonic devices. The target is a planar sheet having one smooth surface to which a resolution pattern is masked. An adhesive is applied to the masked pattern and articles such as gravel or other three-dimensional equivalents are introduced to produce the irregularity to the smooth surface within the confines of the resolution pattern. The resolution pattern for a particular application is selected experimentally, however, a Limansky pattern is used in the present invention for side-scanning sonar resolution measurements.

11 Claims, 2 Drawing Sheets

RESOLVING POWER TARGET FOR SIDE-SCANNING SONARS

The present invention relates to side-scanning sonars. More particularly, the present invention relates to the means for measuring the spatial resolution capabilities of a side-scanning sonar in situ.

BACKGROUND OF THE INVENTION

Side-scanning sonars (SSS) are designed to create visual images of the sea floor and any objects lying thereon. The image is created by scanning the area of interest with acoustic beams. A short acoustic pulse, typically on the order of a millisecond, is launched from the projector array, and it travels away from the array at the sound propagation velocity of the medium, typically about 1500 m/s in sea water. The sea floor and any objects in the sound field reflect a portion of the sound back to the hydrophone array where it is sensed. The two-way travel time of the echos provides a very accurate measure of the distance to the reflecting objects in a direction normal to the major axis of the acoustic array called the cross-track direction. Scanning in the along-track direction is accomplished by physically moving the array while periodically emitting new acoustic pulses. The result is a two-dimensional map of the reflecting objects in the scanned area. The echo amplitudes recorded are related to the size, shape, orientation, and acoustic impedance of the reflecting objects at each spatial location.

The shape of the transmitted acoustic field, i.e., the projector beam pattern, as well as the shape of the receiver array pattern (and more particularly, the shape of their intersection), must be controlled very carefully to produce accurate images. There are a significant number of different approaches to their design, but all have quite broad beams in the vertical plane, typically around 90 degrees centered at 45 degrees below the horizon, and quite narrow beams in the horizontal plane (because the latter defines the sonar resolution in the along-track direction). One or more beams 11 containing the transmitted pulses 12 are produced on each side of the towfish vehicle 13 as illustrated in FIG. 1.

In fact, most modern side-scanning sonars produce extremely narrow search beams on the order of 0.1 degrees in the along-track direction, and this creates significant difficulties in the measurement and calibration process. The hydrophone array itself is usually operated in the near field, or Fresnel zone where range $<<L^2/\lambda$, where L is the total array length and $\lambda$ is the acoustic wavelength, which means it must be focused to produce useful beams. The depth of field is usually so short that the focal distance must be changed for different target distances. This is usually accomplished by subdividing the receiving array into a number of discrete transducer elements and electronically introducing a time delay or phase shift into the received signal that focuses the beam dynamically as the pulse travels. Additionally, side-scan sonars, unlike sector-scan sonars, must change their beam width as the pulse travels so as to maintain a constant along-track resolution at all ranges. This is usually accomplished by electronically changing the length of the hydrophone according to $$N_c = Sr\lambda/d\Delta x,$$

where $N_c$ is the number of array element signals summed to form the beam, Sr is the slant range to the target, d is the element spacing, and $\Delta x$ is the desired along-track resolution. This also requires that the array be divided into a number of discrete elements.

It should be noted that the definition of resolution differs greatly between users in various specialties, sometimes resulting in confusion. Designers of echo ranging sensors, such as sonars and radars, define resolution in the cross-track direction as the half-power points on the autocorrelation function of the echo-ranging signal. For the special but commonly encountered case of a gated single-frequency sinusoid, the cross-track slant range resolution of the sensor is given by $$\Delta Sr = cT/2,$$

where c is the propagation velocity of the energy in the medium and T is the time duration of the transmitted signal. This measure of resolution reveals the capability of the sonar to resolve two point reflectors in close proximity to each other. By contrast, image processing specialists define image resolution as the spatial sampling intervals represented by the image data set. Designers of image display devices, on the other hand, define resolving power as the number of line pairs per unit length that can just be resolved by the output device, where line pairs refers to alternating black and white lines whose width is equal to their spacing. The space occupied by a line pair is equal to the spatial period of the pattern, or the inverse of its square wave frequency. The latter is measured in line pairs per unit length.

Although the dimension of interest in sea bottom profiling is horizontal distance in the cross-track direction, what is actually measured with considerable accuracy is the slant range from the sonar. The conversion from slant range to horizontal range is accomplished by use of the Pythagorean theorem and the assumption that the bottom is horizontal and flat in a gross sense. That is, horizontal range is given by $$Hr = (Sr^2 - He^2)1/2,$$

where Sr is slant range and He is the height of the sonar above the bottom, as illustrated in FIG. 2. The resolution of the sonar in the horizontal cross-track direction is affected by the grazing angle ($\lambda$), and can be calculated from $$\Delta Hr = \Delta Sr/\cos \lambda.$$

Prior Art. The receive array beam pattern is the spatial equivalent of the system impulse response: it is necessary and sufficient to completely specify the system transfer function and thus to allow performance predictions for any operating environment of interest. The usual method is to obtain a measurement of the pattern in a quasi-static situation, i.e., in a test pool under carefully controlled conditions with the array moving very slowly so that a large number of samples can be collected to provide a smooth estimate of the beam pattern. Patterns are usually obtained by rotating the array of interest while receiving pulses from a calibrated projector at a fairly short distance and recording the amplitude versus bearing angle. Alternately, especially for side-scanning sonars, i.e., those producing constant along-track resolution rather than constant angular resolution, a translational pattern may be obtained.

For high resolution side-scanning sonar patterns at long ranges, this process requires a considerable amount of time. For example, measurements of the one-way receive pattern of a 0.1 degree sonar array at a range of 100 m, to obtain a sampling density of at least 10 sample points in the main lobe to provide a smooth pattern, requires spatial sampling intervals of 1.7 cm and a maximum array velocity of 13 cm/s.

Unfortunately, there are several problems with this approach. First, the static patterns do not take into account the effects of motion, such as flow noise, towfish vibration, inaccurate forward velocity estimates, yawing, and side slip. For long arrays, hydrostatic pressure loading on certain types of array construction is not accounted for in a shallow test pool. The effects of temporal and spatial nonhomogeneity in the open sea are not accounted for. Arrays are usually removed from their towfish when being tested in a test tank: several potentially degrading effects are thereby unaccounted for, such as acoustic reflections from the towfish and array deformation due to being rigidly secured to the towfish. Further, it is obvious that normal beam pattern cannot be measured at sea because sonar operating speeds are typically on the order of 50 times that required for good pattern definition.

Finally, and perhaps most importantly, a beam pattern doesn't really provide a useful qualitative measure of image quality to be expected from the sonar, nor does it provide any information at all about the resolution achieved in the range direction. What is required is a means of measuring resolution performance actually being achieved by the sonar while operating in the field under normal operating conditions, and in a way that directly relates to image quality.

In the past, all of this has been largely ignored because no method was available to solve the problem. Efforts to measure SSS resolution and image quality have been very expensive, non quantitative, not repeatable, and not useful for new design because experiment parameters could not be quantified or controlled. Typically, a field of objects of interest is laid according to some plan. The area is almost never surveyed because of the time and cost involved, so the actual location and orientation of targets is usually unknown; and little or nothing is known about the existence, location, and identification of other objects, either natural or man-made. Because of the time required to establish the field and run trials, and the fact that tests are conducted where people, fish, and other sea life are present unbeknownst to the users of the field, targets are frequently disturbed. Also, the size of targets used are often close to that of the sonar resolution, so the limits of resolution are not readily discernible from the resulting images. It will be well known to those skilled in the art that results using this method are very dependent on the type of bottom at the test site, and are thurs almost impossible to reproduce at another test site.

SUMMARY OF INVENTION

It is thus an object of the present invention to provide an apparatus for obtaining accurate and quantitative measurements of side-scanning sonar image resolution.

It is another object of the present invention to provide an apparatus for obtaining accurate and quantitative measurements of side-scanning sonar image resolution at sea and under normal operating conditions.

It is yet another object of the present invention to provide an apparatus for obtaining accurate and quantitative measurements of side-scanning sonar image resolution in various geographies and in the presence of various sea bottom types.

It is still another object of the present invention to provide an apparatus for obtaining accurate and quantitative measurements of side-scanning sonar resolution that is arranged so that the spatial frequency response of the sonar, i.e., the spatial system transfer function, can be measured directly from the echo signals received from the target.

It is an additional object of the present invention to provide an apparatus for obtaining accurate and quantitative measurements of side-scanning sonar resolution in two orthogonal directions, i.e., azimuth and range, simultaneously with a single pass of the sonar past the target.

It is still another object of the present invention to provide an apparatus for obtaining accurate and quantitative measurements of side-scanning sonar resolution that does not require accurate placement of the sonar relative to the target to obtain accurate results.

It is finally an object of the present invention to provide an apparatus for obtaining accurate and quantitative measurements of side scanning sonar resolution in a way that allows an assessment of how actual realized resolution relates to the ability of a sonar to produce images of sufficient quality for the classification of small objects.

The present invention is an apparatus that provides a means of measuring resolution performance actually being achieved by the sonar while operating in the field under normal operating conditions, and in a way that directly relates to image quality.

In order to make the sonar test results repeatable, the apparatus is a target designed in a specific pattern. The apparatus is designed so that the results are independent of the type of bottom at the test site.

For almost all sonar frequencies of interest in sea bottom mapping, any surface that is smooth compared to the sonar's wavelength, such as a common 4 ft by 8 ft sheet of ½inch thick plywood, acts like an acoustic mirror. Nearly all sound impinging on it at grazing angles less than 90 degrees is forward scattered and virtually none is backscattered to the sonar. Thus, a plywood sheet lying on the sea floor, when viewed at the shallow grazing angles typical of side-scanning sonars, appears to a monostotic sonar as a rectangular black hole. By contrast, a layer of gravel, rocks, metal shavings, or other objects having dimensions significantly greater than a wavelength will produce diffuse scattering, so that a portion of the acoustic energy is backscattered toward the sonar receiver where it is perceived as a strong reflector.

A layer of such objects can be readily glued to the plywood sheet in a particular pattern with any of several materials such as epoxy mastic, and the resulting apparatus will reflect acoustic energy in a manner similar to the way optical energy is reflected from a mirror upon which reflective white areas have been painted. Nearly all the energy striking the optically smooth, unpainted areas is scattered forward, whereas energy striking the white diffuse areas is scattered randomly in all directions, including back in the direction of the source. This is one basic premise of the invention. The other is how the areas should be arranged.

It is well known that certain special arrangements of simple black and white shapes like lines can be used to determine the resolving capabilities of optical sensors and output devices such as but not limited to vidicons, CRT monitors, photographic devices, lenses, and paper copiers. Several special optical charts have been developed, each with a particular purpose, including NBS, USAF, EIA, Limansky, Baum, Ealing, and RCA. The present invention uses a modified version of the Limansky chart because it has a particular property that can be used for sonar analysis. The spatial frequency response of the sonar can be calculated directly from the measured echo signals received from the target. The original Limansky chart consists of a series of alternately black and white parallel line pairs arranged in groups of four, and each successive group has its width and spacing selected so that their relative spatial frequencies measured in line-pairs per unit length occur in the ratios 1:3:5:7: . . . :17:19:21. The pattern of the preferred embodiment of the present invention, illustrated in FIG. 3, uses a similar line spacing scheme, but comprises two sets of line groupings arranged orthogonally so that a two-dimensional measure of sonar resolution can be obtained in a single pass. In the present invention, the dark areas in the pattern represent sonar reflective material such as three dimensional particles, e.g. gravel.

It will be evident that other arrangements could be desirable under certain circumstances, and they are also contemplated by the present invention. As an example, the USAF chart has the advantage of containing a larger range of spatial frequencies. This might be useful if it were desired to test several sonars having very different resolution capabilities using a single target. Another example is a cartwheel shape, which, because of its circular symmetry, has the advantage that two orthogonal resolution patterns are always available to the sonar regardless of the flyby angle.

The present invention is thus a water impervious planar sheet of material having one acoustically smooth face. The smooth face is masked off to outline a particular reflective pattern contrasting with the smooth face. The masked reflective pattern receives a coating of water-impermeable mastic adhesive. A layer of sized gravel is applied and caused to adhere to the mastic, thus forming the reflective pattern of the planar target. The weight of the adhered gravel is sufficient to cause the target to sink to the sea floor.

Other objects and advantages of the invention will be set forth in part in the description which follows, and in part will be apparent from the description, or may be learned by practice of the invention. The objects and advantages of the invention may be realized and attained by means of the instrumentalities and combinations particularly pointed out in the appended claims.

DETAILED DESCRIPTION

Figure 1:
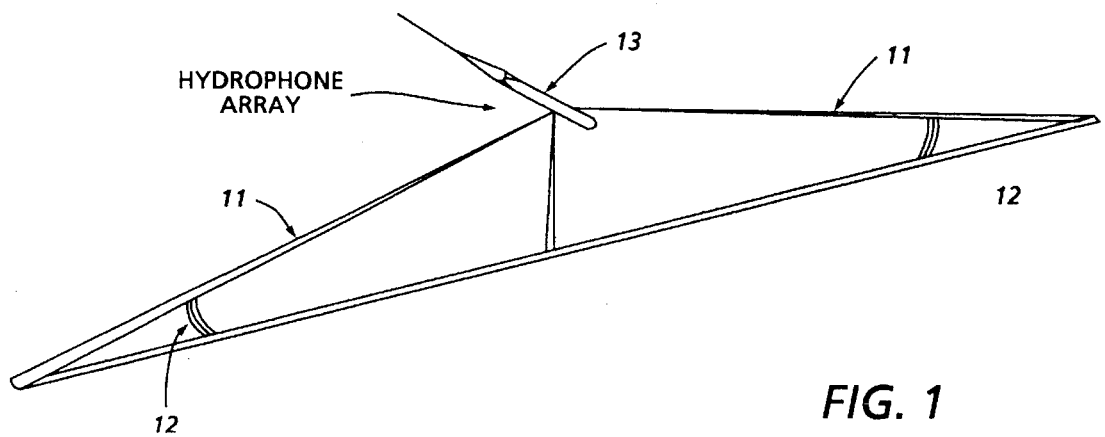
FIG. 1 is a pictorial representation of side-scan sonar geometry with the present invention in place.
Figure 2:
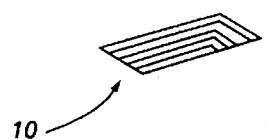
FIG. 2 is a diagram of the relationship between slant and horizontal range resolutions.
Figure 2:
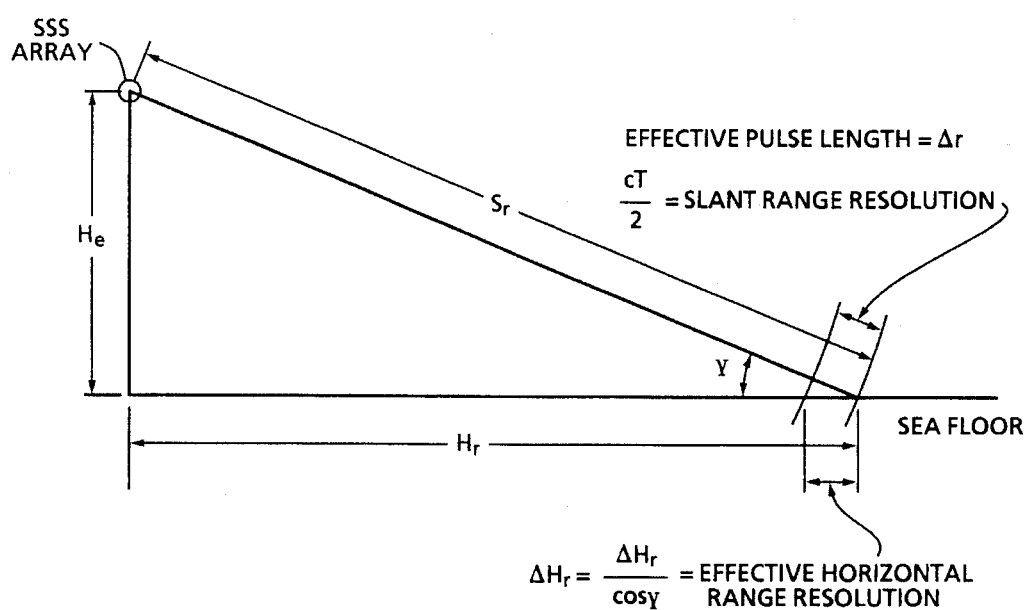
Figure 3:
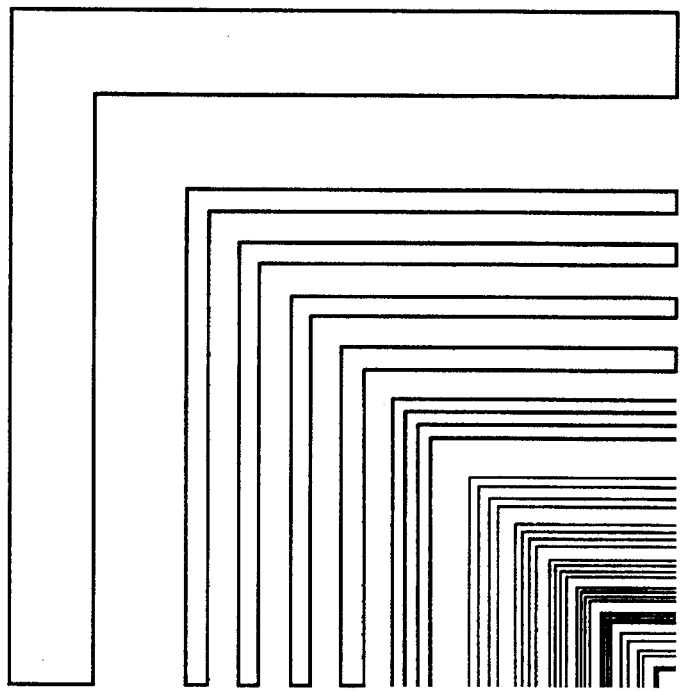
FIG. 3 is a pictorial presentation of a standard resolving power target for a side scanning sonar.
Figure 4:
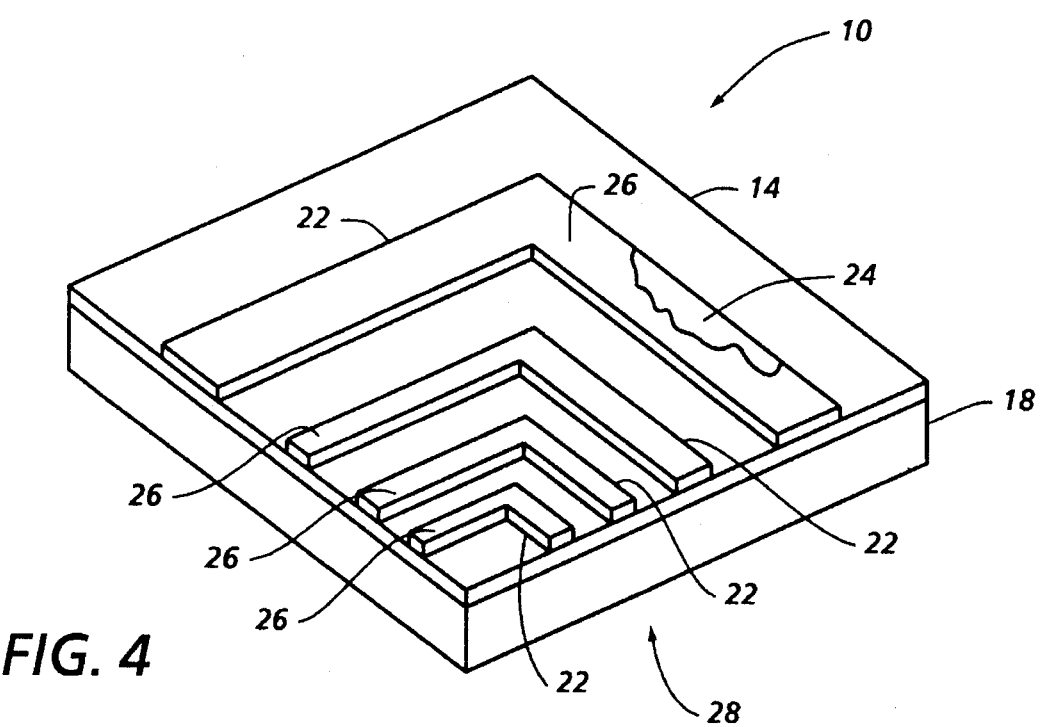
FIG. 4 is a perspective view of the present invention.

The present invention is presented in one preferred embodiment in FIG. 4. The invention, the resolving power target 10 is shown as the planar sheet 14 which may be a sheet of plywood or a waterproof sealed box having a sealable port for introduction of water ballast, as necessary for submergence.

In FIG. 4, the preferred embodiment is a marine or exterior grade plywood sheet four (4) by eight (8) feet by one-half (½) inch.

A seal coating 18 of water impervious epoxy sealant is applied to the sheet 14 to prevent waterlogging and delamination.

The resolution pattern 22 selected from those described above for the particular sonar resolution measurements desired is outlined by masking on the smooth surface 23 of the sheet 14. A waterproof epoxy mastic adhesive 24 is applied to the masked-off resolution pattern and the multi-faceted or three-dimensional reflectors 26 are applied to the adhesive 24. Once the epoxy adhesive 24 is set up bonding the reflectors 26 to the smooth surface 23, the target can be deployed with its opposite surface 28 in contact with the sea bed.

In the preferred embodiment in FIG. 4, a layer of sized gravel is scattered on the target 10 to obtain the desired reflective pattern for the resolution measurements required. In this embodiment, the weight of the gravel added to the weight of the plywood planar sheet 14, the seal coating 18 and the adhesive 24 cause the target 10 to sink to the sea floor.

It will be evident that the description and claims made for this invention in respect to multi-element side-scanning sonars that achieve steering, focusing, shading, or electronic calibration, or a combination of these, whether by digital or any other means, will also apply to single-element arrays, whether fixed focused or not, and also to synthetic aperture sonar (SAS) arrays, and will, in fact, apply to all side-scanning sonars of any nature whatsoever.

It will also be evident to those skilled in the art that the present invention will also apply equally to that class of sonars referred to as sector-scanned classification sonars having very high resolution, and that the resolving power target 10 described herein will be equally useful for resolving power measurements on all such equipment without significant change.

It will further be evident to those skilled in the art that ultrasonic devices used for medical inspection are substantially identical in operation to the sonar devices described above, except that they use higher frequencies and shorter ranges. Therefore, a suitably scaled-down version of the test target described here will be also quite suitable for resolution measurements on such equipments.

The exact details of construction are flexible and will vary with the particular frequencies and resolutions of interest to the user. It will be evident to those skilled in the art that a similar apparatus could be beneficially employed to test and measure resolving power of side-scanning radar arrays in air with all the same advantages previously cited. All of the types of optical charts referred to above can be converted for use as sonar targets in the manner described herein, and this is probably the case for future charts as well, provided they can be viewed beneficially at low grazing angles by a side-scanning sonar.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I now claim as my invention is:

1. An apparatus for obtaining resolving power measurement as a target for a side-scanning sonar, comprising:

a planar sheet having a first flat and acoustically smooth surface, and a second flat surface spaced apart from a thickness and in parallel with said first surface; and a pattern-shaped means for producing side-scanning sonar reflections permitting resolving power measurements, said means affixed to the smooth surface of said sheet by a water insoluble adhesive.

2. The apparatus of claim 1 wherein said planar sheet is water impermeable.

3. The apparatus of claim 1 wherein said planar sheet is heavier than water.

4. The apparatus of claim 1 wherein the combination of said planar sheet and said patterned means is heavier than water.

5. The apparatus of claim 1 wherein said planar sheet is plywood sealed with a water impervious epoxy sealant.

6. The apparatus of claim 1 wherein said planar sheet is a watertight box having a sealable fill-port to permit the introduction of water ballast.

7. The apparatus of claim 1 wherein said pattern-shaped means further comprises:

- a coating of water-impervious adhesive applied to the smooth surface of said planar sheet within the confines of said pattern; and
- a multi-faceted sonar-reflecting article affixed to said sheet by said adhesive.

8. The apparatus of claim 7 wherein said sonar reflecting article has size and facet characteristics selected for the sonar having its resolution determined.

9. The apparatus of claim 8 where said sonar reflecting article is a gravel.

10. An apparatus for obtaining resolving power measurements as a target for a side-scanning sonar, comprising:

- a planar sheet having a flat acoustically smooth surface and an opposite flat surface spaced apart from by a thickness and in parallel with said acoustically smooth surface; and
- a pattern of sonar-reflecting material for producing side-scanning sonar reflections permitting resolving power measurements, said pattern affixed to the smooth surface of said sheet by a waterproof adhesive.

11. The apparatus of claim 10 wherein said sonar reflecting material adhesively affixed additionally provides ballast to said apparatus.

* * * * *